United States Patent

[11] 3,562,506

[72] Inventor Martin Chang
Pointe Claire,Quebec, Canada (485 Allan St. Hawkesbury, Ontario, Canada)

[21] Appl. No. 758,435
[22] Filed Sept. 9, 1968
[45] Patented Feb. 9, 1971

[54] FLUIDIC DECIMAL DECODING DEVICE
3 Claims, 6 Drawing Figs.

[52] U.S. Cl. ..... 235/201, 137/625.46
[51] Int. Cl. ..... G06c 11/00
[50] Field of Search ..... 235/201; 137/81.5, 597, 609, 625.18, 625.19, 625.41, 625.46

[56] References Cited

UNITED STATES PATENTS

| | | | |
|---|---|---|---|
| 2,113,798 | 4/1938 | Mullan | 137/625.46 |
| 3,040,777 | 6/1962 | Carson et al. | 137/625.46 |
| 3,223,123 | 12/1965 | Young | 137/625.46 |
| 3,229,705 | 1/1966 | Norwood | 235/201 |
| 3,339,569 | 9/1967 | Bauer et al. | 235/201 |

*Primary Examiner*—Richard B. Wilkinson
*Assistant Examiner*—Lawrence R. Franklin

ABSTRACT: A pure fluid digital decoding device operated in a decimal code basis so that both the operation and the construction cost of pure fluidic systems can be greatly simplified is shown.

The present invention employs an array of four binary converter stages in a series in combination with a two-leg NOR/OR gate to constitute a decimally recurrent fluid circuit. It further employs a specially designed fluid switch of which the signal outputs from the array of converter stages will be screened before they enter a four-leg NOR-gate. The fluid switch can be preset at any of a set of 10 numbers from zero to nine to allow the four-leg NOR-gate to produce an output stream upon the converter stages obtaining a predetermined count.

A fluid switch in a decimal code system applicable as a fluid element in a decoding mechanism, and an integrated fluid circuit panel comprising the fluid switch is also illustrated.

INVENTOR
MARTIN CHANG
Martin Chang

INVENTOR
MARTIN CHANG
Martin Chang

FLUIDIC DECIMAL DECODING DEVICE

The present invention relates to a pure fluid digital system more particularly used as a presettable decoder in a counting device to recognize predetermined counts in a decimal code system.

This present invention is particularly concerned with a system which may be preset to produce a desired output signal in response to a series of input signals. Such a system is particularly useful in producing an output signal upon the receipt of a particular series of signals or a particular code arrangement of signals such as a specific number in a group of decimal numbers. Alternatively, the device may also produce an output signal upon a counter obtaining a predetermined count without going into a binary coded setting. Such mentioned counter may be of various base systems such as binary, trinary, decimal, etc.

Pure fluidic systems of the type similar to that described above are rarely practical for commercial systems. For instance, a system described in U.S. Pat. No. 3,339,569 Sept. 5,1967, issued to Bauer et al., like many other systems, has two big common drawbacks. The first drawback is that they all employ a binary code system for the "fluid switch." The operator of the device is required to master the binary code before he can handle the device or interpret the result. The second drawback is the use of a large quantity of tubing means as well as fluidic elements in even some simple decoding mechanisms. This makes the construction of the fluidic system complicated and results in extremely bulky size. For example, a simple binary converter of the type disclosed in U.S. Pat. No. 3,001,698, to Warren has four input openings and three output openings. Therefore, it needs seven individual tubes to be connected to the various channels. A simple decoding device of a counting capacity of three decimal numbers will need a total of at least 12such converters according to Bauer's patent, and therefore, 12 fluid switches with the combination of six or more NOR/OR gates. Each of these elements requires at least three individual sections of tubing to be connected to the other elements. It is conceivable that such a device will be very bulky in size and extremely complicated in the circuit structure. This and the previously mentioned drawbacks limited the commercial utility of the conventional fluidic systems.

It is an object of the present invention to provide a pure fluidic, presettable decoding mechanism, employing a rotary disc element to convert the binary code signals into decimal code signals so that overcoming the mentioned first drawback of the fluidic systems.

The above and other features and advantages of the present invention will become apparent upon consideration of the following detailed description of several specific embodiments thereof, especially when taken in conjunction with the accompanying drawings wherein.

Figures 1, 2, 6:
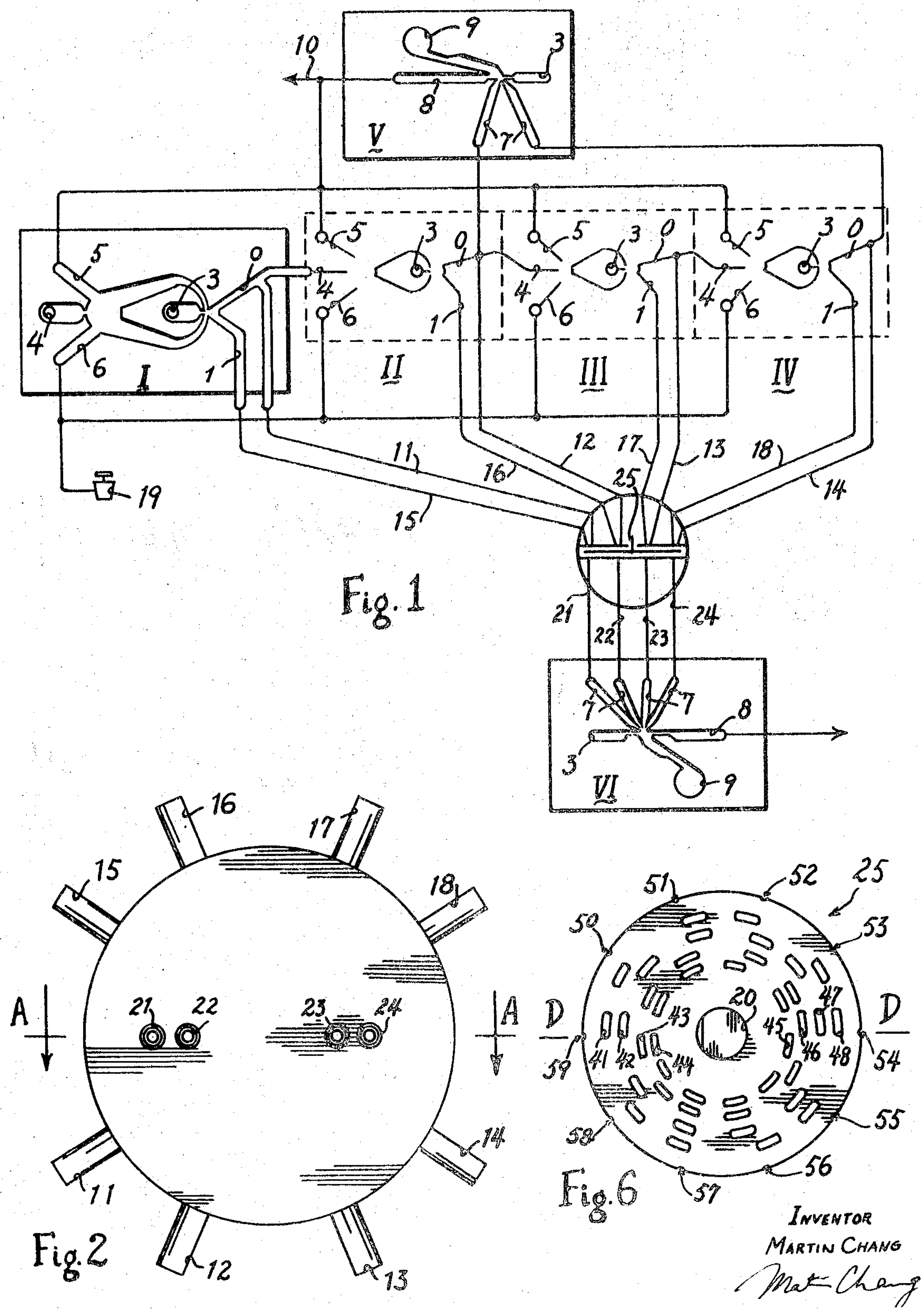
FIG. 1 is a schematic drawing of a fluidic decimal decoding mechanism which consists of a set of four binary converters and related fluid elements which may be preset to produce an output indication upon the converters obtaining a predetermined count.
FIG. 2 is a bottom plan view of the fluid decimal decoding switch which is represented in the center part of FIG. 1 as a circle marked as FDDS with 8 input legs and 4 output legs.
FIG. 6 is a top view of the rotating disc employed in the Fluid Decimal Decoding Switch.

Referring now specifically to FIG. 1 of the accompanying drawings, the reference number I refers to a fluid pulse converter of the general type disclosed in U.S. Pat. No. 3,001,698, to Warren. It is to be understood that other types of pure fluid counterstages may also be employed; such as those disclosed in U.S. Pat. No. 3,114,390. The Warren model is chosen because of simplicity of illustration and because of the employment of the same model in Bauer's patent in the disclosure of his fluid switch. The difference between the present switch mechanism and the Bauer's can be most easily illustrated and distinguished by the use of identical elements as much as possible. This converter comprises a zero output channel 0, arbitrarily selected, a one output channel 1, and a power input 3. A signal input nozzle 4 directs fluid impulse into the converter which passes through a pair of control legs 5 and 6. The power input from 3 will exit either from 0-or 1-leg of the converter I depending on the signal received at any of the input legs 4, 5 and 6. For example, upon the application of a fluid pulse to nozzle 4, the converter switches the stream issued from nozzle 3 to an output channel which is different from the output channel through which the stream is flowing prior to the application of the fluid pulse to nozzle 4, i.e. from 0-leg to 1-leg, or vice versa. Also, any signal input from 5 will switch the output stream to 0-leg and that from 6 will switch the power output to 1-leg of the converter.

Dashed line boxes which are identified by reference numerals II, III, IV, enclose further counterstages which are identical with the counterstage designated by reference numeral I. The illustrations within the boxes are diagrammatic in nature. These similar parts in converters II, III, IV are designated with the same numerals as the corresponding parts in converter I; such as O's and 1's for 0-legs and 1-legs, 5 and 6 for the control input channels, etc. The output channel 0 of the converter state I is connected via a passage (hereafter the word "connected" means connection through a flexible tubing) to the signal input nozzle 4 of the converter II. The fluid pulse converter II is further provided with a zero output passage 0 to be connected to the input nozzle 4 of the third fluid pulse converter III. Similarly, the 0-leg of converter III is connected to the input 4 of the fourth converter IV At the mean time, the output passage of the 0-leg of the second converter II is also connected to one leg 7 of the two-leg "-NOR/gate" V situated on the upper field of FIG. 1. This nor-gate V contains a power input nozzle 3, two signal input legs 7's, one output channel 8, and a fluid sump 9. The output channel 8 of this nor-gate V is connected, jointly, to all four of the control legs 5's of the pulse converters I—IV, and an output opening 10. To the same two-leg nor-gate V, a tubing is provided to connect the other input leg 7 to the 0-leg of the fourth converter IV. These complete the circuit represented by the upper field of the FIG. 1.

Turning to the lower field of the same figure, all output channels from the O-legs 0's of the four pulse converters I—IV are connected to the four input "zero legs" 11—14 of a fluid decimal decoding switch (hereafter represented as FDD switch) and all output channels from the 1-legs of the same pulse converters I—IV are connected to the four input "one-legs" 15—18 of the FDD switch respectively. In addition, a push button signal device 19 is connected, jointly, to all four control legs 6's of the four converters I—IV in series.

Without going into the detail structure of the FDD switch which will be further illustrated later on with reference to FIGS. 2—6, this switch can be simply described as having four input "zero legs" 11—14, four input one-legs 15—18, four output legs 21—24 and one rotary disc 25 housed in an airtight compartment. The rotary disc 25 at any one particular resting position will allow a specific combination of passages of either zero-leg or one-leg input channels 11—18 of the switch to be connected to the four output channels 21—24. The latter 21—24 are accordingly connected to four input legs 7's of a four-leg nor-gate VI, shown in the lowest field of the instant FIG.

In the position of the disc 25 herewith illustrated, the input channels 11, 16, 17 and 14 are allowed to be connected into the output channels 21, 22, 23, 24 respectively. The other channels 15, 12, 13, 18 are all blocked and any fluid stream directed into these channels will not be allowed to enter into any leg of the four-leg nor-gate VI subsequently connected to the FDD switch.

The operating functions of the system are as follows:

First of all, there are constant power supplies of all nozzles 3's of the fluid elements, i.e., four converters I—IV and two nor-gates V and VI.

Secondly, a signal at the push button 19 will reset all counting stages of the four converters to zero setting. This signal will first set all power streams to 1's legs of all converters. Therefore there is no fluid going into nor-gate V, thus producing a power output at 8 to reset all streams from 3's to 0's.

Thirdly, a signal output from channel 8 of the two-leg nor-gate V will reset all counting stages to zero setting.

Fourthly, there will be a power output at channel 8 of nor-gate V whenever no signal is delivered to both input legs 7's of this fluid element V.

Fifthly, there will be a power output at the output channel 8 of nor-gate VI whenever there is no signal input to all the four legs 7's or this nor-gate VI.

And, finally, the signal inputs to the FDD switch will either be blocked or delivered through the switch depending on the setting of the rotary disc 25.

The truth table of the four-element fluid converter I—IV is presented in Table I as follows: (where Cvt. stands for Converter

TABLE I

| | Converter IV | Converter III | Converter II | Converter I |
|---|---|---|---|---|
| Pulse: | | | | |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |
| 16 | 0 | 0 | 0 | 0 |

Since both 0-legs of the second and the fourth converters II and IV are connected to both input legs of the O-legs V, there will be at least one fluid stream delivered at all time to this nor-gate for the logic stages from zero to nine according to Table I. Thus the fluid stream of this nor-gate is diverted to the sump 9 for these corresponding counting stages. However, at the tenth counting stage, the logic output is 1, 0, 1, 0. The power streams in all four converters are now distributed to the 0-leg of converter I, 1-leg of converter II, 0-leg of converter VI and 1-leg of converter IV. There will be no signal or fluid stream in both O-legs of the second and the fourth converters and hence the power stream of the two-leg nor-gate V is shifted from the sump 9 to the output channel 8. This output stream will bring back all fluid streams in the four converters to zero state immediately. Before the 11th pulse comes to the input nozzle 4 of the first converter, the counting stage has already been set back to zero and henceforth ready to register the coming 11th pulse as another first pulse. Following this, the 12th pulse will now be registered as the second pulse, etc. The function of the mechanism presented in the upper half of FIG. 1, i.e., the combination of the series converters and the two-leg nor-gate, is therefore to recycle the counting of a series of input pulses on a decimal basis and to give an output signal at every 10th pulse received by this system.

The working principle of the FDD switch of FIG. 1 is such that at every setting of the disc 25, only a specific coded stream from the series converters I—IV will be completely blocked by this switch so that no signal will be delivered into any leg of the four-leg nor-gate VI subsequently following. For example, at the present setting, which is the setting of nine in the switch dial, channels 11, 16, 17 and 14 are allowed to be connected to the output channels 21—24 of the switch. This corresponds to a logic stage of 0, 1, 1, 0 which is a total opposite to the binary logic of the ninth pulse according to Table I. This is to say, whenever the ninth and only the ninth pulse is counted by the mechanism, all the output streams from these four converters will be blocked by the disc 25 and therefore no signal is delivered to any leg of the nor-gate VI. Thus, at this moment only, the fluid input at nozzle 3 of this nor-gate VI will go out at the output channel 8. At all other counts than the ninth pulse, there would at least be one fluid stream from the series converters going through the switch and diverting the power stream of the nor-gate VI to the sump 9.

In summary to the above disclosure, the complete decoding system as indicated in FIG. 1 is able to give, on receiving a series of input pulses, a powered signal output at every 10th pulse and another powered signal at every preset number of pulse out of every 10 input pulses delivered therein. Furthermore, this mechanism can store the stage of counting up to a total number of ten and this storage of counts can be erased at will via the push button mechanism provided.

Figure 3:
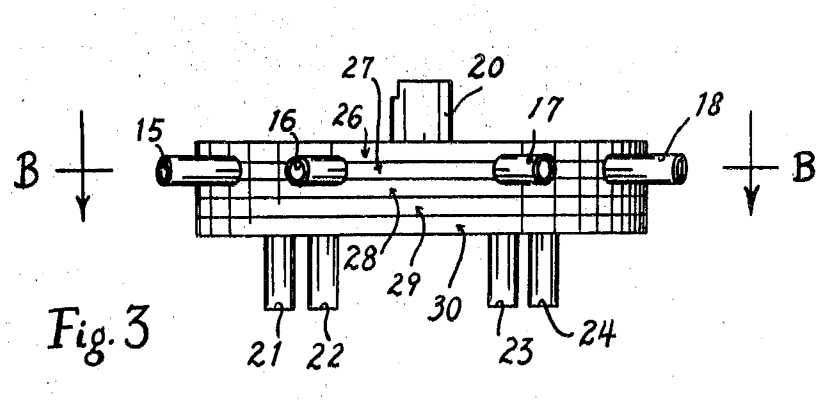
FIG. 3 is a side view of FIG. 2.
Figure 4:
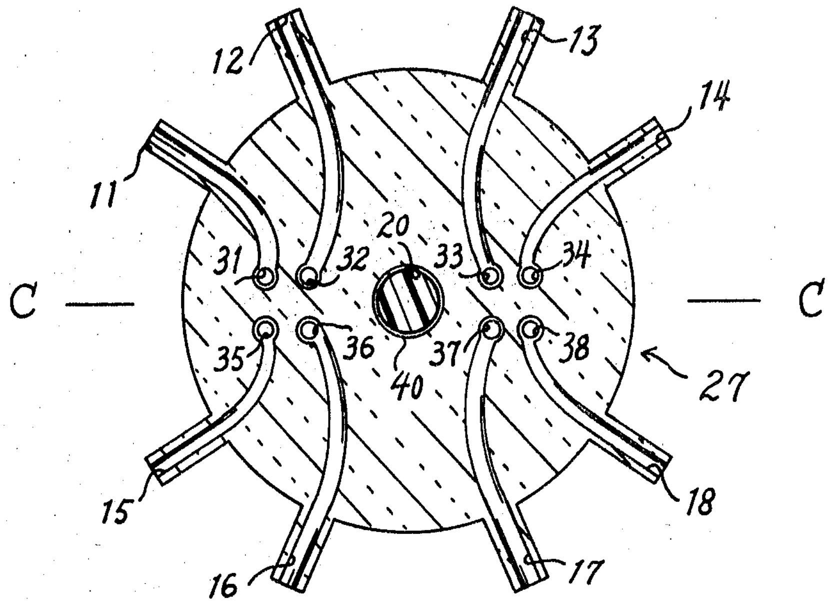
FIG. 4 is a cross section taken along line B–B of FIG. 3.

The structure required for providing the presettable mechanism of the FDD switch is further illustrated in detail in FIGS. 2—6. The switch is composed of basically, a securely packed five layered disc structure 26—30 having eight input channels 11—18 along its circumference and four output channels 21—24 at the bottom layer along a diameter of the disc 30 as shown in FIGS. 2—3. There is also a rotary disc 25 of a smaller diameter than the sandwiched discs housed within the fourth layer 29. This rotary disc 25 has an axial extrusion 20 sticking out upwardly through the third, second and first layers 28, 27, 26 of the sandwiched structure. The sectioned plan in FIG. 4 shows the structure of the second plate 27 of the FDD switch. There is a total of eight input channels 11—18 leading to a series of eight orifices 31—38 spaced in two rows separated by an equal distance from the diameter C–C of the plate 27. These orifices 31—38 are also bored through the third layer plate 28 immediately below plate 27. At the center of these plates, i.e., the top plate 26, the second plate 27, and the third plate 28, a hole 40 large enough to contain the axial protrusion 20 of the rotary disc 25 without obstructing its movement is bored. As shown clearly in FIG. 4, these eight orifices are spaced in pairs, say 31, and 35, 32 and 36, etc., and are arranged in such positions that the distances between the center points of these four pairs of orifices and the geometric center of the plate 27 are largest for the 31 and 35 pair, second largest for the 34 and 38 pair and smallest for the 33 and 37 pair. This arrangement is for the purpose of matching the four circles of oval apertures on the rotary disc 25 which will be illustrated later on.

The structure of the fourth layer of the FDD switch consists of basically a hollowed ring 29. Housed into this ring is a rotary disc 25 and a index pin or detent 39. The thickness of the disc 25 should be about the same as the hollow ring 29 so as to achieve a substantially air tight condition between the disc 25 and its housing, i.e., plates 28, 29 and 30. The index pin 39 is located at the intersection of the inner edge of the ring 29 and the section line C–C of FIG. 4 and protrudes a small distance into the hollowed space enclosed by the ring 29 for the indexing of the rotary disc 25.

The last layer of the switch or layer 30 is in turn made of a circular plate having four outlet channels 21—24 along a diameter C–C immediately below the centers of the four pairs of orifices 31—38 of the second layer 27 of this switch. The spacing of these channels 21—24 is shown clearly in FIG. 2.

Figure 5:
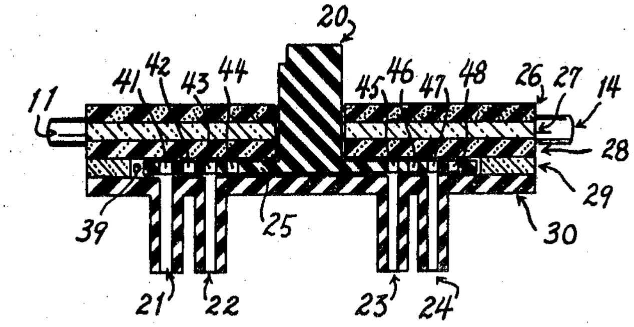
FIG. 5 is a cross section taken along line A–A of FIG. 2.

The interrelationship of the rotary disc 25 and its housing is best illustrated in FIG. 5. Shown in this FIG. is a section along line A–A of FIG. 2. All the five layers 26—30 of the FDD switch are packed tightly together. The only movable part is the rotary disc 25 with its axis extending through layers 26, 27, 28. A dial mark in 10 divisions can be provided on the surface of the upper layer 26 to facilitate the setting of the rotary disc of this switch.

Referring particularly to FIG. 6, a plurality of ovate apertures are provided on the rotary disc 25, for example, apertures 41—48 along D–D line which coincides with line C–C of FIG. 4. The arrangement of these apertures constitutes the key function of the FDD switch. The cited series of ovate apertures 41—48 is only one of the five series of apertures aligned along five equally spaced diameters of the disc 25. These generally ovate-shaped apertures have sufficient length to encompass either row of zero orifices 31—34. (See FIG. 4) or one orifices 35—38 to output orifices 21—24, (see FIG. 2) at any one time. In the position illustrated, the orifices 31 and 21, 36 and 22, 37 and 23 and 34 and 24 are interconnected through the ovate apertures 41, 43, 45 and 47, respectively. Therefore, at this position of the rotary disc, input channels 11, 16, 17 and 14 are interconnected to the output channels 21—24 of the FDD switch. This combination corresponds to a logic state of 0, 1, 1, 0 as illustrated previously.

For a comprehensive description, there are a total of 40 ovate apertures on the disc 25 distributed evenly along four concentric circles. These circles are so spaced that the apertures on the outmost circle such as aperture 41, will connect either one of the most distant pair of orifices 31 and 35 of the second and third layer plates 27, 28, to that of opening 21 of the bottom plate 30. The apertures on the second circle such as aperture 47, connect only the second most distant pair of orifices 34 and 38 to that of the orifice 24. Similarly, the third circle apertures connect the 32 and 36 pair to the output opening 22; and those of the inside circle connect the last pair of orifices 33 and 37 to that of opening 23.

These ovate apertures are also radially arranged into 10 groups of four apertures each and are placed along a total number of five diameters defined by a series of slots or notches 50—59 equally spaced along the edge of the disc 25. Thus, apertures 41, 47, 43, 45 (ranked in the order of their position in the first, second, third and fourth circles), along the diameter drawn from the slots 54 to 59, belong to one group, i.e. group nine. Apertures 48, 42, 46 and 44 belong to another group, namely, group four among the 10 radial groups.

When the disc 25 is preset to rest in such a position so that the index pin 39 is extruding into the slot 59, the group nine apertures 41, 47, 43, 45 will be engaged to channel 21—24 respectively as shown in FIG. 5. If the disc 25 is now turned 180° so that index pin 39 points at slot 54, the other group or group four of apertures 48, 46, 44 and 42 will be engaged to channels 21—24 respectively. In the latter case, the logic stage of the FDD switch will be a complete opposite to that of the fourth pulse counted by the series converters as listed in Table I.

The following logic table, Table 2, will specify all logic stages of the 40 ovate apertures in 10 radial groups:

TABLE 2

| Index pin rests at— | Group No. | Fourth converter | Third converter | Second converter | First converter |
|---|---|---|---|---|---|
| 50 | 0 | 1 | 1 | 1 | 1 |
| 51 | 1 | 1 | 1 | 1 | 0 |
| 52 | 2 | 1 | 1 | 0 | 1 |
| 53 | 3 | 1 | 1 | 0 | 0 |
| 54 | 4 | 1 | 0 | 1 | 1 |
| 55 | 5 | 1 | 0 | 1 | 0 |
| 56 | 6 | 1 | 0 | 0 | 1 |
| 57 | 7 | 1 | 0 | 0 | 0 |
| 58 | 8 | 0 | 1 | 1 | 1 |
| 59 | 9 | 0 | 1 | 1 | 0 |

If one compares Table I with Table 2, one can immediately find that the logic stages of the former are just the opposite to that of the latter. Therefore the function of the FDD switch is such that it will blockade all four output streams from the binary converters only when the logic stage of the output streams from these converters is completely opposite to the logic stage of the preset rotary disc. In other words, if the rotary disc is preset at number nine, only at the counting stage of nine of the converters will the output streams be completely blocked by the FDD switch and therefore no signal goes into any foot of the four-leg nor-gate VI thus triggering a fluid signal through output channel 8 of this nor-gate.

Referring more specifically to FIG. 5 and 6, the indexing of the rotary disc 25 is assisted by the index pin or detent 39 housed in the inner portion of the ring structure 29. The detent 39 consists of solid metal head and a spring tail so that it will extrude a small portion of its head into the space enclosed by the ring 29. The rotary disc 25 can be turned either clockwise or counterclockwise in the FDD switch through its axial extrusion 20 and some other proper attachment such as a wingnut or a knob fixed at the other end of the extrusion 20. Due to the presence of the index pin 39, the operator of the FDD switch can always feel a click action every time the pin is engaged into either of the slots 50 59 of the rotary disc 25. A series of digital numbers from zero to nine may be engraved or painted on the upper surface of the covering plate 26 around the protrusion of the disc 25 to facilitate the presetting function of the FDD switch.

It is apparent from the above disclosure that, with the decoding apparatus of the present invention, an operator may set any desired number, from zero to nine exclusively, into this decoder mechanism by simply turning the rotary disc 25, or wingnut attached to it, of the FDD switch to a selected number. The decoding mechanism will now be ready to perform the following function:

1. Give a power signal at every 10 count of input pulses.
2. Give a power signal at every count of preset value out of every 10 counts of input pulses.

This apparatus is able to eliminate a number of active switching elements which would otherwise be required to achieve the same functions. Also, such an arrangement leads to the complete elimination of the knowledge of the binary coding system which would be otherwise a prerequisite for any operator of a fluid logic device prior to the present invention.

In summary, a decimal decoding mechanism is made possible according to the disclosure of the present invention. This mechanism employs a combination of four binary converters in series, one four-leg nor-gate, one two-leg nor-gate, and a specially coded rotary disc switch to enable the operation of the decoding mechanism in a conventional decimal logic code so that it greatly reduces the costly and complicated binary code system of the ordinary fluid mechanisms.

I claim:

1. A selector switch for connecting selected pneumatic input lines to selected output lines comprising:

a plurality of circular plates having a common axis, including:

a fixed cover plate, a fixed input plate having a plurality of input lines connected to respective channels in said input plate, each channel having a terminal orifice, a fixed separator plate having a plurality of pairs of orifices therein arranged in two columns, each column being equidistant from a common diameter of said plates, each pair being positioned a different axial distance from said common axis, and each orifice being aligned with a respective one of said terminal orifices, a rotatable logic plate, a fixed output plate having a plurality of output lines pneumatically connected to output orifices, each output orifice positioned along said common diameter at the same respective axial distance as said each pair of orifices, a plurality of sets of slots in said logic plate, each slot positioned to connect one orifice of each said pair to said respectively positioned output orifice, and a means for positioning said logic plate at a plurality of settings.

2. A selector switch as in claim 1 wherein said logic plate is of less diameter than the other plates, a hollow ring surrounding said logic plate, a plurality of notches in the periphery of said logic plate, and an index pin in said hollow ring for releasably engaging said notches.

3. A selector switch as in claim 1 wherein said means is an axial protrusion passing through said cover, input, and separator plates, said protrusion being fixedly connected to said logic plate.